United States Patent [19]

Bell

[11] Patent Number: 4,775,937

[45] Date of Patent: Oct. 4, 1988

[54] COMBINED FIXED PRICE AND EXPECTED DIVIDEND BETTING SYSTEM

[75] Inventor: Michael J. Bell, West Pennant Hills, Australia

[73] Assignee: Atl Pty. Limited, New South Wales, Australia

[21] Appl. No.: 894,201

[22] Filed: Aug. 7, 1986

[30] Foreign Application Priority Data

Sep. 20, 1985 [AU] Australia .............................. PH2536

[51] Int. Cl.[4] .............................................. G06F 15/28

[52] U.S. Cl. ................................ 364/412; 273/138 A

[58] Field of Search ............................... 364/412, 410; 273/138 A

[56] References Cited

U.S. PATENT DOCUMENTS 4,322,612 3/1982 Lange ................................. 364/412

4,494,197 1/1985 Troy et al. .......................... 364/412

FOREIGN PATENT DOCUMENTS 6061861 9/1985 Japan .................................. 364/412

2138602 10/1984 United Kingdom ................ 364/412

*Primary Examiner*—Jerry Smith

*Assistant Examiner*—Allen MacDonald

*Attorney, Agent, or Firm*—Finnegan, Henderson, Farabow, Garrett & Dunner

[57] ABSTRACT

A betting system having a number of betting terminals and displays connected to a central control unit. The betting system allows both fixed price and expected dividend betting by continually calculating the odds and liabilities in respect of each contestant and ensuring that the total liability incurred does not exceed the total amount of money wagered. Only expected dividend betting is allowed until a threshold level of wagers received is reached either by wagers received at the terminals or by transfers of funds from another body. Once the threshold is reached both fixed price and expected dividend betting is allowed by the system.

14 Claims, 1 Drawing Sheet

COMBINED FIXED PRICE AND EXPECTED DIVIDEND BETTING SYSTEM

FIELD OF THE INVENTION

Figure 1:
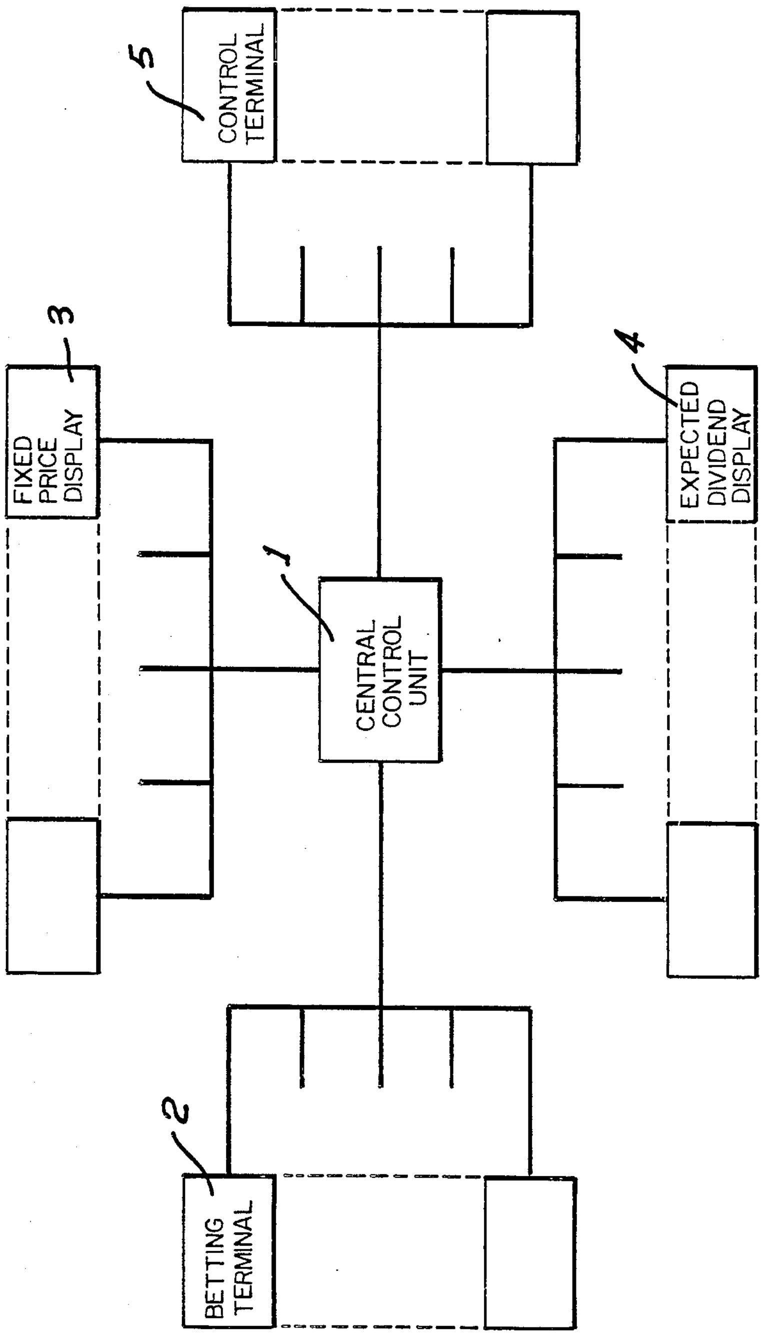

This invention concerns apparatus for receiving and registering betting wagers at displayed odds whether fixed price or expected dividend and for automatically adjusting such odds in accordance with liabilities already incurred. Wagers may be placed at one or more betting locations on one or more participants in an intended contest.

This invention applies to wagers on single or multiple contestants winning or completing in a specified sequence or specified sequences a single contest or multiple contests.

BACKGROUND OF THE INVENTION

Operators of gambling systems such as those used on racecourses are traditionally divided into two groups.

The first group is that which accepts wagers with a payout which is agreed at the time the wager is made. These are 'bookmakers' and offer 'fixed price bets'. There are normally a number of bookmakers at a racecourse in a competitive market and the average of their offered fixed prices or 'odds' at the time the race starts is the 'starting price'.

The second group accepts wagers on the basis that all monies which have been bet will be shared amongst the winners after the deduction of a commission to cover the overheads of the operator. These are 'tote operators' and pay a 'dividend' to winners. There is normally only one such operator at a racecourse and its activities are normally defined by government regulation.

The operatees of gambling systems are 'punters'.

Fixed price betting is inherently more attractive to the avid punter as he knows at the time of making the wager what his winnings will be. With tote betting, the actual dividend paid may be considerably less than that expected at the time the wager was made. To satisfy this demand, tote operators would like to provide a fixed price betting service for punters.

This invention provides a fixed price betting service in conjunction with the provision of totalisator betting.

One problem in providing a fixed price betting service on its own is that it is essentially gambling on the part of the operator. Having accepted some wagers and their incurred liabilities, the fixed price betting operator has no guarantee that other wagers will be made to cover that liability. Tote operators, being government legislated bodies, are not empowered to gamble in this way. The embodiments of the invention overcome this problem and allows tote operators to gain income merely from the commission deducted from total turnover.

A second problem is that of deciding what prices are to be offered at the commencement of betting. If these are not representative of the true merits of the contestants, either intenetionally or unintentionally on the part of the individual deciding them, then the operator could be liable for losses as outlined above. The embodiments of the invention overcome this problem by automatically determining what these offered prices should be.

A third problem is that of maintaining a distribution of wagers in such a way that the liability of any one contestant does not exceed the total amount wagered. The embodiments of the invention overcome this problem by automatically adjusting the prices being offered to account for the total amount wagered and the liability already incurred for that contestant.

A number of other problems related to immunity from price-rigging, stability of offered odds and the maintenance of a minimum totalisator dividend are also addressed by embodiments of this invention.

According to one aspect, the present invention comprises a fixed odds betting system providing fixed price and expected dividend betting including;

a control unit, a plurality of betting terminals coupled to said control unit for inputting details of a punter's wager, a plurality of display means for displaying odds and expected dividends, coupled to said control unit, a control terminal for inputting control instructions to the system, coupled to said control unit, said control unit comprising:

- liability calculation means for calculating from the information received from each betting terminal the liability incurred for each contestant,
- first accumulation means for calculating the total amount of money wagered;
- second accumulation means for calculating the total amount of uncancellable expected dividend wagers;
- fixed price calculation means for calculating the fixed price payable in respect of each contestant;
- expected dividend calculation means for calculating the expected dividend payable in respect of each contestant;

said control unit adapted to operate such that the liability incurred for any one contestant cannot exceed the total amount of money wagered, and, said betting terminals are adapted to issue a record of each betting transaction indicating details of wager, and the fixed price payable in respect of said wager following completion of the calculations by said control unit in respect of said transaction, said system adapted to initially only provide expected dividend betting until the total amount of uncancellable expect dividend wagers is equal to a predetermined figure after which both expected dividend and fixed price betting are provided.

Embodiments of the invention will now be described, by way of example only, with reference to the accompanying drawing in which:

FIG. 1 shows a block schematic of the betting system according to the invention.

In a preferred form the apparatus of the invention is applied and utilised for betting transactions occurring in a number of betting positions around a racecourse. In such a case there will be several races each possibly containing between ten and twenty-four contestants in respect of which a large variety of odds, both fixed price and expected dividend, may be displayed in accordance with their degree of favouritism, and wagers may be made at stakes which vary in value between very wide limits.

Referring to the drawing, the betting system is comprised of a central control unit 1 with computational facilities, multiple betting terminals 2, multiple displays 3 for fixed prices, multiple displays for expected dividends 4 and multiple control terminals 5. These components may be dependently or independently powered but function as a cohesive system due to the exchange of data. In the preferred embodiment, such exchange of data occurs over communications cables but any other responsive communications method is acceptable.

In the preferred embodiment, the betting terminals use keyboards and pre-marked slip and ticket readers as input means to receive the details of the punter's wager. Other input devices such as touch TV screens are acceptable. Such wagers may be at the current fixed price or they may be totalisator bets.

The details of the punter's wager are transmitted to the control unit where they recorded for use in the computation of the liability incurred on each contestant and its resultant fixed price and expected dividend.

Notification that the wager is accepted and recorded at the control unit is transmitted to the originating terminal where a receipt is printed as the punter's record of the wager. This receipt also bears a code which uniquely identifies the corresponding record at the control unit.

Simultaneously, the current fixed price being offered and dividend expected are computed by the control unit and displayed on the relevant displays. These displays may be television monitors, multi-segment panels, dot-matrix panels or video-matrices.

To overcome operator and punter mistakes, a facility is provided to cancel a wager after it has been recorded. This is achieved at the betting terminal by entering the wager's unique identification code together with a function code for cancellation. This information is transmitted to the control unit where the wager is removed from the accumulated totals of wagers and liabilities. A response is transmitted to the originating terminal where a printed receipt of the cancellation is produced. The expected dividends and fixed prices are recalculated to account for the cancelled wager and the new values are displayed.

In the preferred embodiment, cancellation is inhibited for fixed price wagers to prevent price rigging.

The system needs a pool of tote bets which cannot be cancelled. This can be constituted by the transfers from the government legislated body controlling tote betting or it can be provided from the race course in the following way:

Allow the system to cancel a punter's tote bets while the punter is still at the betting terminal, but prevent cancellation of these bets after some other punter has placed a bet at that betting terminal. This is accomplished by having the betting terminal operator or the punter indicate when he has completed his bets by pressing a button on the terminal. This is communicated to the control unit which thereafter inhibits cancellation of all bets made at that terminal before the notification.

Two sets of collations are maintained for tote bets.

One set includes all uncancelled tote bets made so far including those which may yet be cancelled. This is used for calculating the expected dividends.

The other includes only those tote bets which cannot be cancelled. In the preferred embodiment this second set of collations consists of only the transfers from the government legislated body controlling tote betting but it could include uncancellable on-course tote bets as described above.

A proportion of the uncancellable tote bets is used in the calculation of the expected dividends and the remainder is used in the calculation of fixed prices. This proportion is a system parameter between 1% and 99% and in the preferred embodiment is 50%.

In the beginning, only tote betting is allowed. Expected dividends based on the first set of collations are displayed.

The expected dividend for a contestant is calculated as follows (Equation 1.):

$$ED(C) = \frac{((TFPW + P*TUTW)*(1 - T\&C) - FPL(C))}{(FPW(C) + P*UTW(C))}$$

where

ED(C) is the expected dividend for this contestant,

TFPW is the total of all fixed price wagers,

P is the proportion supplied as a system parameter,

TUTW is the total of all uncancellable tote wagers,

T&C is the proportion deducted for taxation and commision,

FPL(C) is the fixed price liability already incurred on this contestant,

FPW(C) is the sum of fixed price wagers on this contestant, and

UTW(C) is the sum of uncancellable tote wagers on this contestant.

Note that the expected dividend for a contestant is undefined if the denominator is zero.

It will be seen that, prior to the commencement of fixed price betting, there will be no fixed price liability on any contestant and that, for the preferred implementation in which the uncancellable tote wagers are in fact the transfers from a government legislated body controlling tote betting, this equation reduces to the traditional expected dividends based on tote betting.

In many places, tote regulations require that a minimum dividend be paid in return for a wager and that the deficit be made up firstly from other dividends and, ultimately, from the tote operator's revenues.

When the expected dividend for a contestant (as calculated by Equation 1) is less than the minimum dividend then the deficit is calculated as follows (Equation 2):

$$MDD(C) = (FPW(C) + P + UTW(C))*(GMD - ED(C))$$

where

MDD(C) is the minimum dividend deficit on the contestant,

GMD is the guaranteed minimum dividend, and the other terms are as in Equation 1.

The expected dividend is then set equal to the minimum dividend (Equation 3):

$$ED(C) = GMD$$

Note that if the expected dividend for a contestant from Equation 1 is greater than the minimum, then the deficit for that contestant is zero.

Prior to display, the expected dividends are rounded down or up to the nearest payment increment as defined in the legislation pertaining to the installation. In the preferred embodiment they are rounded down to the nearest 5 cents.

When a certain preset condition is satisfied, the system automatically enables fixed price betting and commences displaying fixed prices as well as expected dividends. This condition could be that the amount wagered as uncancellable tote bets has reached a preset figure or, as in the preferred embodiment, that the initial transfers from the government legislated body controlling tote betting have been received. Manual override for the enable is provided via the control terminals.

The fixed price for each contestant is calculated as follows (Equation 4):

$$FP(C) = \frac{((1 - P)^* TUTW + MFPW)^*(1 - T\&C)}{((1 - P)^* UTW(C) + MFPW)}$$

where

FP(C) is the fixed price for the contestant,

MFPW is the maximum allowed fixed price wager and all other symbols are as defined previously.

The maximum allowed fixed price wager is a system parameter, the effect of which is to control the growth of fixed price liability. It may be a fixed value or dynamic. In the preferred embodiment it is set to 1% of the current total of uncancellable tote wagers.

In effect, the fixed price for a contestant is what the expected dividend would be if a fixed price wager equal to the maximum allowed had been placed on that contestant.

Note that the fixed prices offered in Equation 4 cannot result in the system operator having a fixed price liability in excess of the amount available to cover it. As fixed price betting proceeds, the system must respond to changes in the distribution of betting so as to maintain this situation. It does this by adjusting the fixed prices offered for each contestant in accordance with the betting trends.

If fixed price wagers are made, resulting in a liability for a particular contestant, then this liability must be deducted from the amount available to cover future liabilities otherwise the total incurred liability may grow, through excessively high fixed odds, to exceed the monies available to cover the liability.

Note that the greater the offered fixed price, the greater the incurred liability if the wager is made. When computing the fixed odd to be offered, therefore, the system should respond not only to previously incurred liability but also to the price at which it was incurred.

For this reason the system exaggerates the previously incurred liability by a responsiveness factor which is proportional to the average fixed price for previously incurred liability as follows (Equation 5):

$$RF(C) = \frac{FPL(C)}{FPW(C)} * SRP$$

where

RF(C) is the responsiveness factor for the contestant,

SRP is the system responsiveness parameter and all other symbols are as defined previously.

Note that if FPW(C) equals zero, then RF(C) is set equal to one. Note also that the system responsiveness parameter may be changed to suit the implementation and in the preferred embodiment is set equal to 4%.

In this way the system is especially responsive to liabilities incurred at high prices.

With these considerations, the calculation of fixed price for a contestant may be defined as follows (Equation 6):

$$FP(C) = \frac{(((1 - P)^* TUTW + MFPW)^*(1 - T\&C) - MDD(C) - FPL(C)^* RF(C))}{((1 - P)^* UTW(C) + MFPW)}$$

where all symbols are as defined previously.

Note that it is possible for the fixed price so calculated to actually offer less than money wagered back. However, this situation would not arise realistically as punters would not make wagers on a contestant for little or no return.

Analysis of the equation above shows that it is impossible to incur a liabiltiy in excess of the monies available to cover it. In this way, the invention provides a system whereby its operator may function on the basis of a commission deducted from total turnover and not from a profit/loss gambling mechanism.

It is essential to the maintenance of the system that the fixed prices offered be recalculated each time a fixed price wager is made. As the frequency of fixed price wagers increase approaching the running of the race, this could result in marked fluctuations in the fixed prices being offered. If this becomes excessive, punters may be unable to follow betting trends and may decide not to use the system.

To provide apparent stability of fixed prices being offered the system does not display the exact fixed prices as calculated above in Equation 6, but uses those values to select from a range of prices for display and use in later computations.

For the preferred embodiment the range is as follows: from $1.00 to $1.95 in increments of $0.05, from $2.00 to $2.90 in increments of $0.10, from $3.00 to $4.75 in increments of $0.25, from $5.00 to $9.50 in increments of $0.50, from $10.00 to $19.00 in increments of $1.00, from $20.00 to $45.00 in increments of $5.00, from $50.00 to $100.00 in increments of $10.00.

It will be understood by those skilled in the art that other embodiments and modifications of the invention described are possible without departing from the scope or spirit of the invention.

I claim:

1. A fixed odds betting system providing fixed price and expected dividend betting comprising;

a control unit, a plurality of betting terminals coupled to said control unit for inputting details to the control unit of a punter's wager entered at a particular terminal, a plurality of display means for displaying odds and expected dividends, coupled to said control unit, a control terminal for inputting control instructions to the system, coupled to said control unit, said control unit comprising:

liability calculation means for calculating from the information received from each betting terminal the liability incurred for each contestant;

first accumulation means for accumulating the total amount of the wagers;

second accumulation means for accumulating the total amount of uncancellable expected dividend wagers;

fixed price calculation means coupled to said liability calculation means and said first and second accumulation means for calculating the fixed price payable in respect of each contestant;

expected divided calculation means coupled to said liability calculation means and said first and second accumulation means for calculating the expected dividend payable in respect of each contestant;

said control unit including means for preventing the liability incurred for any one contestant from exceeding the total amount of the wagers.

and, said betting terminals including means responsive to said control unit to issue a record of each betting transaction indicating details of a wager, and the fixed price payable in respect of said wager following completion of the calculations by said control unti in respect of said transaction;

said system including means for initially only providing expected dividend betting until the total amount of uncancellable expected dividend wagers is equal to a predetermined figure after which both expected dividend and fixed price betting are provided.

2. A fixed odds betting system according to claim 1 wherein each betting terminal includes input means for receiving details of a punter's wager.

3. A fixed odds betting system according to claim 2 wherein said input means comprises a keyboard and reader means for reading information from a premarked slip or ticket.

4. A fixed odds betting system according to claim 3 wherein each betting terminal includes printer means for printing a receipt including said record of each betting transaction and a code uniquely identifying said record.

5. A fixed odds betting system according claim 1 wherein said control unit further includes wager cancellation means for removing a wager from the system by adjusting said total amount of money wagered and said liability incurred for each contestant and recalculating the fixed price and the expected dividend payable on each contestant.

6. A fixed odds betting system according to claim 5 wherein said betting terminal originating a request for a wager cancellation includes means responsive to said wager cancellation means for issuing a receipt including details of said cancellation following cancellation by said wager cancellation means.

7. A fixed odds betting system according to claim 6 wherein said wager cancellation means prevents cancellation of wagers made using fixed price betting unless said request is made before a further transaction is processed by said betting terminal originating said request.

8. A fixed odds betting system according to claim 7 wherein said second accumulation means accumulates transfers of funds from a government legislated body controlling tote betting.

9. A fixed odds betting system according to claim 1 wherein said first accumulation means includes means for accumulating the total of all fixed price wagers, said second accumulation means includes means for accumulating the total of uncancellable expected dividend wagers on each contestant, and said liability calculation means includes means for calculating a fixed price liability incurred in respect of each contestant.

10. A fixed odds betting system according to claim 9 wherein said control unit includes a third accumulation means for accumulating the total amount of fixed priced wagers on each contestant.

11. A fixed odds betting system according to claim 10 wherein said expected dividend calculation means calculates the expected dividend for any one contestant in accordance with the following equation:

$$ED(C) = \frac{((TFPW + P^*TUTW)^*(1 - T\&C) - FPL(C))}{(FPW(C) + P^*UTW(C))}$$

where

ED(C) is the expected dividend for said contestant;

TFPW is the total of all fixed price wagers;

P is a constant proportion supplied as a system parameter;

TUTW is the total of all uncancellable expected dividend wagers;

T&C is a proportion deducted for taxation and commision;

FPL(C) is the fixed price liability already incurred on said contestant;

FPW(C) is the sum of fixed price wagers on said contestant;

UTW(C) is the total of uncancellable expected dividend wagers on said contestant; and C is an integer representative of said contestant.

12. A fixed odds betting system according to claim 11 wherein said fixed price calculation means calculates a fixed price for any one contestant in accordance with the following equation:

$$FP(C) = \frac{((1 - P)^*TUTW + MFPW)^*(1 - T\&C)}{((1 - P)^*UTW(C) + MFPW)}$$

where

FP(C) is the fixed price for said contestant; and

MFPW is a maximum allowed fixed price wager.

13. A fixed odds betting system acorrding to claim 11 wherein said fixed price calculation means calculates a fixed price for any one contestant in accordance with the following equations:

$$FP(C) = \frac{(((1 - P)^*TUTW + MFPW)^*(1 - T\&C) - MDD(C) - FPL(C)^*RF(C))}{((1 - P)^*UTW(C) + MFPW)}$$

where, $$RF(C) = \frac{(FPL(C)}{(FPW(C)} * SRP$$

$$MDD(C) = (FPW(C) + P^*UTW(C))^*(GMD - ED(C))$$

SRP is a system responsiveness parameter; and

GMD is a guaranteed minimum dividend.

14. A fixed odds betting system according to claim 11 wherein said control unit comprises computer means.

* * * * *